July 27, 1965
H. E. BRYS
3,196,646
METHOD AND APPARATUS FOR MAINTAINING SUBSTANTIALLY CONSTANT
STRIP GAUGE IN A TANDEM MILL
Filed Oct. 30, 1961
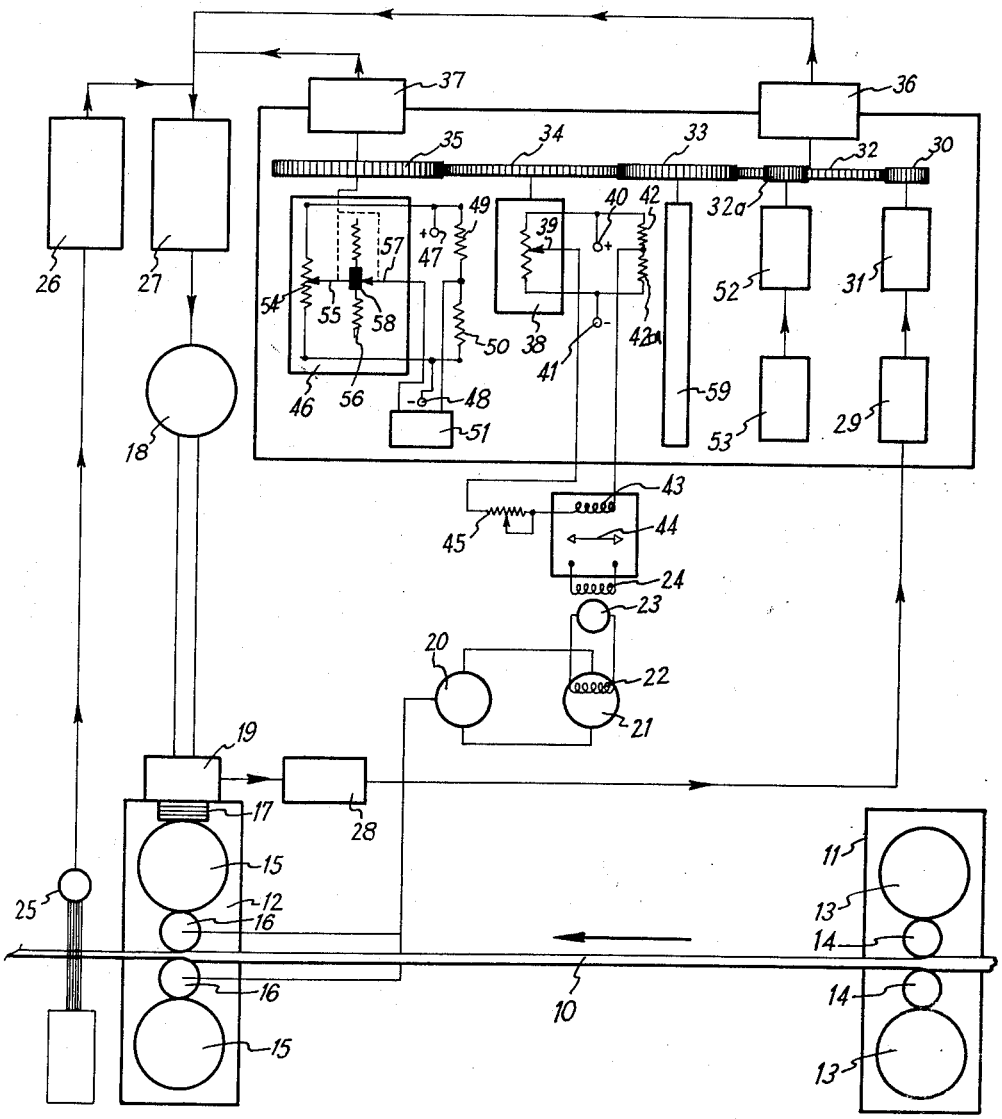
INVENTOR.
HARRY EUGENE BRYS,
BY
*Yungblut, Melville, Strasser & Foster*
ATTORNEYS.

United States Patent Office 3,196,646
Patented July 27, 1965

3,196,646
METHOD AND APPARATUS FOR MAINTAINING SUBSTANTIALLY CONSTANT STRIP GAUGE IN A TANDEM MILL
Harry Eugene Brys, Butler, Pa., assignor to Armco Steel Corporation, Middletown, Ohio, a corporation of Ohio
Filed Oct. 30, 1961, Ser. No. 148,680
10 Claims. (Cl. 72—9)

This invention relates to a method and apparatus for maintaining substantially constant strip gauge in a tandem strip rolling mill. The method and the apparatus described herein may be used in either a cold strip mill or a hot strip mill but its benefits are particularly valuable and important in a hot strip mill.

It is known in the art to continuously measure the gauge of strip issuing from a tandem mill consisting of two or more stands or rolling mills and to correct for an increase or decrease in gauge by modifying the screw-down or by increasing or decreasing the tension on the strip between stands. It has also been proposed to correct for variations in gauge by a combination of screw-down control and tension control. Tension has generally been controlled by means of tensiometers such as loopers, but the operation of loopers is too slow and subject to oscillation and simply cannot be completely effective because, in order for a looper to function, there must be an error to be corrected. In other words, a change in the tension on the strip must be present before the looper will operate to correct the change in tension. It is also known to adjust the strip tension by varying the speed of the rolls in response to changes in the roll separating forces, the stand housing strains, and the strip temperature. However, these methods are extremely complicated and therefore expensive.

Even a momentary change in tension on the strip affects the gauge adversely due to slippage or loss of bite on the strip. This is particularly true in hot strip milling where it is imperative that the strip tension between stands remain as nearly constant as possible in order to prevent "necking down," to prevent cobbles resulting from loss of tension, and to facilitate guiding of the strip so as to produce a strip having better edges and less camber.

With the foregoing considerations in mind, it is a principal object of the invention to provide basically for the corection for a deviation in strip gauge by control of the mill screw-down, and to adjust the speed of the mill motor concurrently with the screw-down adjustment to compensate for the change in strip tension which would otherwise occur as a result of the change in the screw-down.

It is, therefore, an object of the invention to provide for a control of the speed of the mill motor driving the work rolls, which control is actuated concurrently with actuation of the screw-down.

It is a further object of the invention to actuate the screw-down control by means of a signal obtained from a thickness gauge disposed on the exit side of the mill, to provide for integration of signals from the gauge, and to provide a time delay in order to prevent "hunting" by the use of apparatus as disclosed in my copending application, Serial No. 743,187 filed June 19, 1958, and now U.S. Patent 3,109,966. By the use of such a signal impulse integrator with a variable time delay, a small deviation may not initiate screw-down movement and it may take a number of small deviations or a large deviation of short duration to produce an operation of the screw-down mechanism.

It is another object of the invention to provide for automatic gauge control as above outlined while still leaving the basic operation of the mill under the control of the "roller" and "speeder."

By the accomplishment of the foregoing objects it has been possible to produce a more uniform strip gauge in a more economical manner than any system known heretofore.

In its broader aspects, the invention may be said to relate to the maintenance of a standard quality in any kind of a production process where a correction for deviation from a standard quality produces a side effect, which side effect in turn affects the quality which is to be maintained.

These and other objects of the invention which I shall disclose in more detail hereinafter or which will be apparent to one skilled in the art upon reading these specifications, I accomplish by that certain construction and arrangement of parts and by that series of method steps of which I shall now disclose an exemplary embodiment.

Reference is made to the drawings forming a part hereof and in which the single figure is a block diagram with certain portions showing electrical circuits where necessary to understanding of the invention.

Briefly, in the practice of the invention and as it relates particularly to a strip rolling mill, I am concerned with the problem of maintaining a substantially constant strip gauge and I do this by causing changes in gauge to produce actuation of a screw-down mechanism in the appropriate direction to make the necessary correction. In this connection I am faced with the problem that a change in the screw-down setting will produce a corresponding change in strip tension between stands. Thus, if the gauge becomes slightly thicker, the screw-down will operate in a down direction to roll the strip thinner; but this operation of the screw-down will in effect cause a backing up of the strip entering the stand whose screw-down is being adjusted and produce a loss in strip tension between this stand and the preceding stand. In order to compensate for this decrease in tension, the mill motor of the stand whose screw-down is being adjusted must be speeded up. I, therefore, cause actuation of the screw-down mechanism concurrently to control the speed of the mill motor of said stand so that the change in tension which would normally be expected to result from a change in the screw-down is instantaneously compensated for, wherefore no change in strip tension will occur.

While in the following description I will describe the method and the apparatus with particular reference to a strip rolling mill and, while it is equally applicable to a hot mill or a cold mill, it will be clear to those skilled in the art that the advantages produced by the present invention are more important to the successful operation of a hot strip mill. It will of course be understood that while I shall describe the invention with particular reference to a strip rolling mill, it has, as pointed out above, a broader aspect making it useful for various controls in automated machinery where the control of one factor to correct a deviation from a standard produces deviations in another factor which in and of itself will effect a deviation from said standard.

Referring now in greater detail to the drawing, I have shown a metallic strip 10 moving from right to left through a rolling mill stand 11 and a rolling mill stand 12. It will be understood that the tandem mill will ordinarily include additional stands and it will likewise be understood that in a cold strip mill the strip will come from a decoiler to the right of the figure and will be taken up on a coiler to the left of the figure. In a hot mill of course the strip will previously have been rolled down from a slab by one or more stands to the right of the figure and not included in the tandem mill and the strip to the left of the figure may be further reduced in another stand or stands or may be taken up in a coiler. If the strip is passed through succeeding stands, these stands of course must be speed compensated.

As is well understood in the art, the stand 11 may have the back-up rolls 13 and working rolls 14, and the stand 12 may have the back-up rolls 15 and working rolls 16. The stand 12 is shown diagrammatically as having screws 17 actuated by a screw-down motor 18 through a gear reduction 19. The working rolls 16 will be understood to be driven in the usual manner by a mill drive motor 20. The mill drive motor may be energized by a generator 21 and will have a field coil 22 separately excited by an exciter motor 23 having a field coil 24.

As the strip exits from the stand 12, it will sensed by means of a thickness gauge 25. This may be an X-ray thickness gauge which is well known is the art and does not form a part of the present invention. The signal from the gauge 25 is transmitted to the block 26 which is a signal impulse integrator with variable time delay. This device may be as disclosed in my said copending application Serial No. 743,178. The integrated and classified signal is utilized to actuate through suitable relays (not shown) the screw-down control 27 in either the up or down direction to produce the desired correction. The screw-down control 27 actuates the screw-down motor 18 in well known manner and the rotation of the screw-down motor 18 is transmitted through the gear reduction 19 to the screws 17, whereby the gauge of the strip being rolled by the working rolls 16 will be changed.

The motion of the screw-down mechanism is transmitted mechanically from the gear reduction 19 to a high accuracy selsyn transmitter 28 and the selsyn transmitter 28 transmits to a high accuracy selsyn receiver 29. The selsyn receiver 29 is mechanically coupled to a gear 30 through a magnetic clutch 31. The clutch 31 is automatically engaged when either the up or down relay is closed to operate the screw-down mechanism.

From the description thus far, it will be understood that whenever the integrated and classified signal from the gauge 25 is of such magnitude or duration as to produce operation of the screw-down motor 18, the selsyn transmitter will rotate a proportionate amount and the rotation of the transmitter 28 is transmitted electrically to the receiver 29 so that it will rotate the same amount as the transmitter 28, and since the magnetic clutch will have been engaged, this rotation will be transmitted to the gear 30. Thus, every time the screw 17 rotates, the gear 30 also rotates and the gear 30 will rotate in one direction for a downward movement of the screw 17 and in the other direction upon an upward movement of the screw 17.

The gear 30 is the initial gear in a gear train including the gears 32, 33, 34 and 35. The gear 32 can be seen to rotate in the opposite direction from the gear 35. The gears 32 and 35 are connected respectively to drive the revolution counters 36 and 37. One of these may be considered to be a revolution counter for up movement of the screw and the other as the revolution counter for down movement of the screw. These revolution counters 36 and 37 are adjustable as is well known in the art and it will be seen from the diagram that they are connected into the screw-down control 27 so that after a predetermined number of revolutions in either the up or down direction, they will interrupt the signal from the device 26 to stop operation of the screw-down. This action is necessary because the device 26 has no time control over operation of the screws and the screws would continue to turn and would be likely to produce an overcorrection. The mill operator may, therefore, set up an arbitrary increment of screw-down adjustment on the revolution counters 36 and 37 so that corrections are made in relatively small increments. When the screw-down mechanism is stopped by the devices 36 or 37, it will start again upon a further signal from the device 26 if the gauge 25 indicates that the correction was insufficient. By varying the number of counts or revolutions of the gear train between successive responses to the strip gauge deviation, the roller can adjust the sensitivity of the system and adapt it to the rolling of materials of widely different work hardening rates.

The gear 34 in the gear train is connected to a potentiometer 38 so as to drive the slider thereof indicated at 39. The potentiometer 38 is preferably what is known as a multi-turn potentiometer having a central zero position. The potentiometer 38 forms a part of a bridge circuit powered at the terminals 40 and 41 and including the resistors 42 and 42a.

It will be clear that when the slider 39 is in the null position the bridge circuit is balanced and no current flows in the bridge output circuit. If the gear 34 has rotated as a result of operation of the screw-down mechanism, the slider 39 is moved in one direction or the other from its null position and the bridge is thereby unbalanced so that a current flows through the output circuit in one direction or the other. This circuit includes a winding 43 in a regulator device 44. The regulator 44 may be of any suitable type such as a magnetic amplifier, a rotating regulator, an electronic regulator, or ignitron rectifiers. The regulator 44 controls the field coil 24 of the exciter motor 23, which in turn controls the field coil 22 of the generator 21, thereby changing the voltage supplied to the mill drive motor 20. Since the polarity of the current through the coil 43 is dependent upon whether the screw-down moved upward or downward, it will be clear that ultimately the speed of the mill drive motor is accordingly increased or reduced. It will also be clear that the correction of the mill drive motor speed is instantaneous and concurrent with the movement of the screw-down mechanism so that a compensation is made before an error occurs, and thus the tension on the strip between the stands 11 and 12 remains substantially constant in the face of adjustment of the screw-down in either direction by the screw-down motor 18.

In the bridge circuit there is also a potentiometer 45 which is the "speeder's" preset adjustment for the amount of speed compensation which the automatic gauge control system may make. It will thus be clear that the "speeder" can independently adjust the speed of the mill stand motor if necessary or desirable, using the conventional existing rheostat.

Since the mechanism described above must operate initially from a null or zero position in either direction, it is necessary that at the completion of a rolling operation, i.e. when the strip leaves the mill, means must be provided to return the mechanism to its null or zero position. This is accomplished as follows. It will be noted from the drawing that the gear 35 not only drives one of the revolution counters 37 but it also drives the slider of a potentiometer generally indicated at 46. This potentiometer is in a bridge circuit fed from the terminals 47, 48 and the bridge circuit includes the resistors 49 and 50.

As is usual in such bridge circuits, if the potentiometer 46 is at its null or zero position no current flows in the bridge output circuit. When the potentiometer 46 is unbalanced by movement of its slider off the null or zero position, the bridge circuit is unbalanced and current flows in the bridge output circuit in one direction or the other, depending upon the direction of movement of a slider. This bridge circuit is connected to a polarized relay 51, and connections (not shown) are provided between the relay 51 and either the mill stand screw-down motor control 27 or the clutch 52 and motor 53, which are arranged to drive the gear 32a. Means (not shown) are provided to energize the relay 51 each time a bar leaves the mill.

When the system is in automatic control, the output of relay 51 will initiate the mill stand screw-down motor 18 in either the up or down directions, depending upon which way the screws have traveled in the rolling of the preceding bar, to return the screws to their original position, or to a new position if the roller has manually operated the screws during the previous rolling. The original position is sensed or known as the control system is returned to null position by means of the selsyns, gear train, and bridge circuits previously described. This correction stops when the relay 51 senses no further error from the output of the bridge circuit 46. Thus the screw-down as well as the roll speed is reset to the proper position for rolling the next bar.

In the event the roller has exerted manual control of screw-down position, resettting is accomplished as follows: the relay 51 is energized, the clutch 52 is engaged and the motor 53 is energized to drive the gear 32a. This drive is in the opposite direction to the rotation theretofore put into the gear train by the gear 30, and thus the gear train and its associated elements are returned to the null or zero position. Therefore, when the system is in manual operation, only the speed is returned to its original value when the control system is reset for the next rolling operation. The screw-down position is manually reset by the roller.

Coming now to a more detailed description of the potentiometer 46, it will be observed that it is actually a double potentiometer consisting of a potentiometer 54 which is connected in conventional manner into the bridge circuit having a slider 55 and a supplementary potentiometer 56 having a slider 57. As indicated by the broken lines extending from the gear 35, it will be understood that rotation of the gear 35 concurrently rotates both sliders 55 and 57 the same amount. It will be noted that electrically the potentiometers 54 and 56, with their sliders 55 and 57, are connected in series and that the ends of the turns of the potentiometer 56 are free, i.e. not connected into the circuit. It will also be noted that the central turns of resistance of the potentiometer 56, as indicated at 58, are shorted out as by being covered with solder or in any suitable manner. The result of this is that when the sliders 55 and 57 move only slightly off center, the potentiometer 56 has no effect on the bridge circuit and the unbalance of the potentiometer 54 determines the amount of current flow in one direction or other in the bridge output circuit. In other words, the effect is as though there were no potentiometer 56. However, when the potentiometer slider 57 moves off the short circuited turns 58 while the slider 55 continues to move in the same direction and the same amount, it will be seen that the voltage unbalance of the bridge increases but, since an increasing amount of series resistance is added to the bridge output circuit, the current flowing through relay 51 is limited to a safe value.

The output of the polarized relay 51 energizes either the screw-down motor 18 or the reset motor 53 depending upon whether the control is in automatic or manual operation, as described previously. This action occurs when the trailing end of the strip leaves the mill and a particular rolling operation is completed.

In order to prevent excessive movement of the mechanism in either direction, a limit switch device indicated at 59 is actuated by the gear 33. This limit switch may be entirely conventional and does not require description. It simply shuts off the screw-down motor when its limit is reached in either direction.

It will be understood that at the start of a rolling operation the initial screw position and the initial speed of the the mill motor have been established in the usual way by the "roller" and "speeder." All the parts of the mechanism described are in their null, zero or midpoint position. From then on the screw-down control and mill motor speed control may be automatic. Even under automatic control, the roller may make minor or occasional jogging screw-down corrections, but these corrections are handled by the above described apparatus just as though these corrections had been signaled by the thickness gauge; and at completion of the rolling operation the apparatus will still return to its original or null position.

Although the automatic gauge control system has been described as a method for adjusting the roll spacing and speed of a single mill stand in a tandem mill, the system is applicable to the control of other stands from strip thickness deviations received from the same or different thickness gauges. A single gauge correction may be applied simultaneously to two or more stands independently, or in combination to control any number of stands.

It will be clear that numerous modifications may be made without departing from the spirit of the invention and I, therefore, do not intend to limit myself otherwise that as set forth in the claims which follow.

Having now fully described my invention, what I claim as new and desire to secure by Letters Patent is:

1. In a strip rolling mill comprising at least two mill stands having screw-down mechanisms and mill drive motors, through which the strip passes in being rolled, a gauge disposed to sense the thickness of the strip issuing from one of the mill stands and to produce a qualitative electrical signal upon deviation of the strip thickness from a predetermined gauge, at least one of said mill stands being a control stand, means for causing said qualitative signal to initiate operation of said screw-down mechanism of said control stand in the appropriate direction to correct said deviation, a speed control for the mill drive motor of said control stand, an operative connection between said screw-down mechanism and said speed control, whereby said speed control is actuated in the appropriate direction concurrently with said screw-down mechanism to compensate for change in tension on the strip between said mill stands which would otherwise be produced by said screw-down operation, means for measuring the amount of movement of said screw-down mechanism, means actuated by said measuring means for interrupting operation of said screw-down mechanism after a predetermined amount of movement irrespective of completion of the correction, and an operative connection between said screw-down mechanism and said measuring means.

2. Apparatus according to claim 1, wherein a gear train is provided and operatively connected to said screw-down mechanism to be driven thereby, a bridge circuit including a potentiometer actuated by said gear train to unbalance said bridge circuit in one direction or the other in accordance with movement of said screw-down mechanism in one direction or the other, to produce a current flow in one direction or the other in said bridge output circuit, and means to cause said current flow proportionately to change the speed of said mill motor in one direction or the other.

3. Apparatus according to claim 1, wherein said screw-down mechanism drives a selsyn transmitter, and said gear train is driven by a selsyn receiver, and operative electrical connections are provided between said selsyn transmitter and receiver.

4. Apparatus according to claim 1, wherein a revolution counter is driven by said gear train, said revolution counter being arranged to actuate a switch after a predetermined number of revolutions, means to set the number of revolutions required to actuate said switch, and means actuated by said switch to deenergize said screw-down mechanism.

5. Apparatus according to claim 1, wherein said gear train drives a limit switch device to limit the movement of said screw-down mechanism in either direction.

6. Apparatus according to claim 1, wherein said gear train actuates a second potentiometer, said second potentiometer being in a bridge circuit connected to a polarized relay, whereby said bridge circuit is unbalanced in one direction or the other in accordance with movement of said screw-down mechanism, means to actuate said relay upon exit of the trailing end of a strip from said mill stand, means connecting said relay with said screw-down mechanism to reset said screw-down mechanism and said gear train and associated elements to their original position.

7. Apparatus according to claim 6, wherein said second potentiometer has associated with it a third potentiometer, the sliders of said second and third potentiometers being connected in series and driven concurrently by said gear train, a central portion of the resistance turns of said third potentiometer being short circuited, whereby said third potentiometer does not affect said bridge output circuit during the movement of its slider in the region of the short circuited resistance turns, and whereby upon movement of its slider beyond said short circuited turns, it increases the series resistance of the output circuit of said bridge as said bridge is further unbalanced, thereby limiting the output current of said bridge circuit.

8. Apparatus according to claim 1, wherein said gear train actuates a second potentiometer, said second potentiometer being in a bridge circuit connected to a polarized relay, whereby said bridge circuit is unbalanced in one direction or the other in accordance with movement of said screw-down mechanism, means to actuate said relay upon exit of the trailing end of a strip from said mill stand, a resetting motor arranged to drive said gear train, and means for energizing said resetting motor to operate in one direction or the other in response to the actuation of said relay to reset said gear train and associated elements to their original position.

9. Apparatus according to claim 8, wherein said second potentiometer has associated with it a third potentiometer, the sliders of said second and third potentiometers being connected in series and driven concurrently by said gear train, a central portion of the resistance turns of said third potentiometer being short circuited, whereby said third potentiometer does not affect said bridge output circuit during the movement of its slider in the region of the short circuited resistance turns, and whereby upon movement of its slider beyond said short circuited turns, it increases the series resistance of the output circuit of said bridge as said bridge is further unbalanced, thereby limiting the output current of said bridge circuit.

10. The method of maintaining substantially constant strip gauge in a strip rolling mill without affecting strip tension between mill stands, which includes the steps of constantly sensing the gauge of the issuing strip, causing a deviation from a predetermined gauge to initiate operation of the mill screw-down in the appropriate direction to correct said deviation, causing the operation of the mill screw-down concurrently to change the roll speed instantaneously in the appropriate direction to compensate instantaneously for the change in strip tension which would otherwise be produced by said operation of the screw-down, manually pre-setting an arbitrary amount of correction, and terminating operation of the mill screw-down after said predetermined amount of movement irrespective of completion of the correction, and continuously repeating said steps to make the necessary correction in increments.

References Cited by the Examiner

UNITED STATES PATENTS

| | | | |
|---|---|---|---|
| 2,678,985 | 5/54 | Smith | 338—128 |
| 2,726,922 | 12/55 | Merrill et al. | 18—2 |
| 2,934,731 | 4/60 | Cotton | 338—128 |
| 3,024,670 | 3/62 | Warren et al. | 80—56 |
| 3,045,517 | 7/62 | Wallace et al. | 80—56.1 |
| 3,049,036 | 8/62 | Wallace et al. | 80—56.1 |
| 3,089,365 | 5/63 | Wallace et al. | 80—56.1 |
| 3,101,016 | 8/63 | Gill | 80—56 |

FOREIGN PATENTS 607,961  11/60  Canada.

WILLIAM J. STEPHENSON, *Primary Examiner.*

LEON PEAR, CHARLES W. LANHAM, *Examiners.*